Oct. 6, 1959  D. R. LEWIS ET AL  2,907,103
METHOD OF MAKING AN INTERNALLY LINED PIPE
Filed Jan. 7, 1957  4 Sheets-Sheet 1
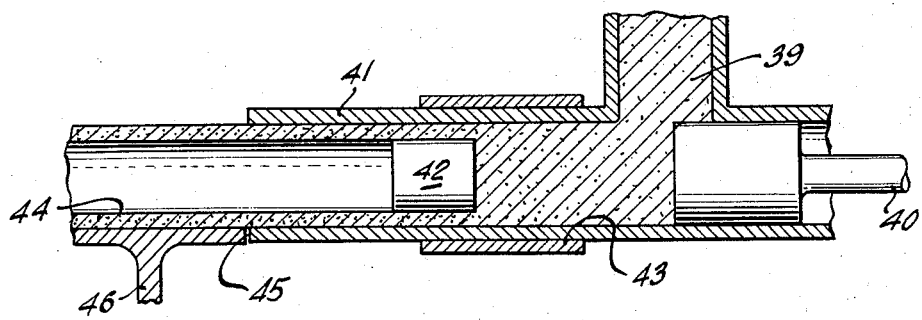
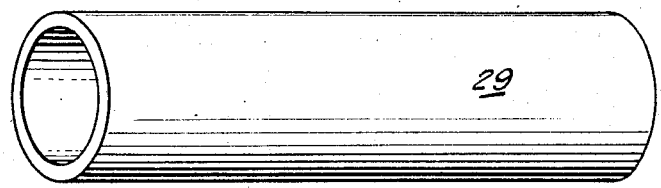
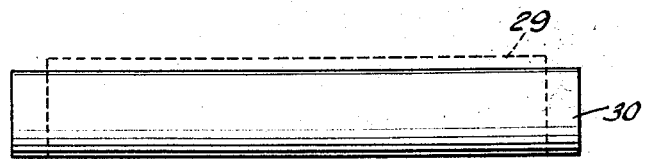
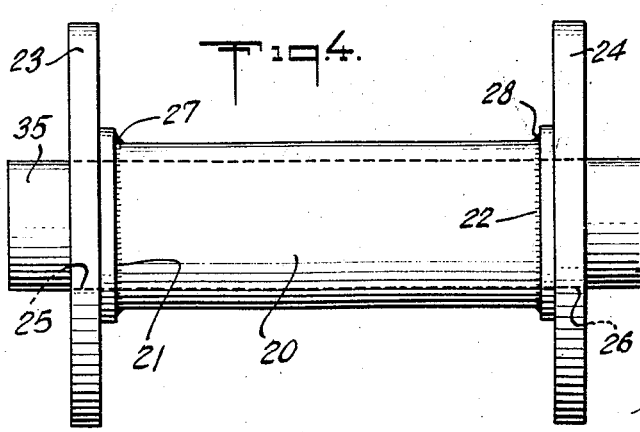
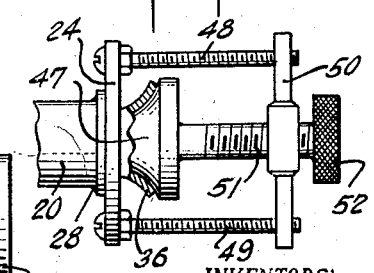
INVENTORS:
DOUGLAS R. LEWIS
JOSEPH A. JAFFE
BY
ATTORNEY Oct. 6, 1959    D. R. LEWIS ET AL    2,907,103
METHOD OF MAKING AN INTERNALLY LINED PIPE
Filed Jan. 7, 1957    4 Sheets-Sheet 2

INVENTORS:
DOUGLAS R. LEWIS
JOSEPH A. JAFFE
BY
ATTORNEY

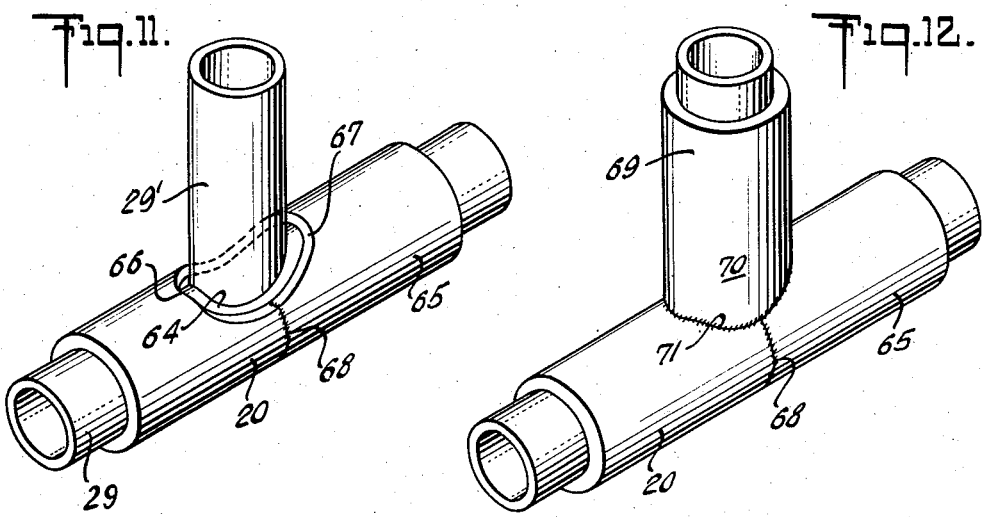
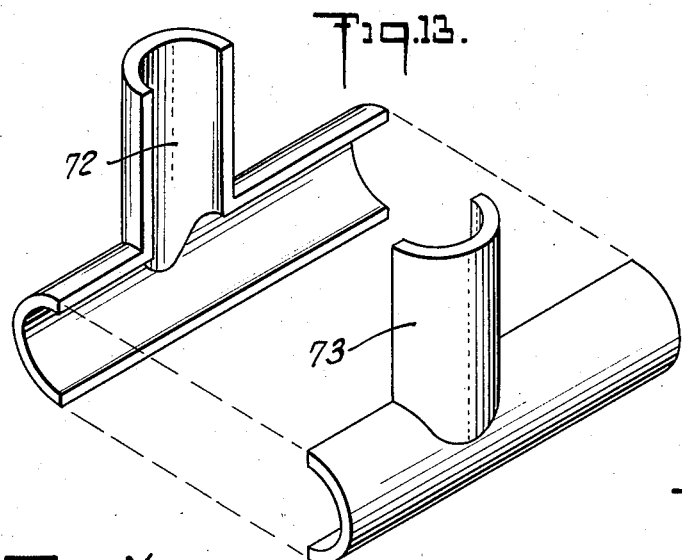
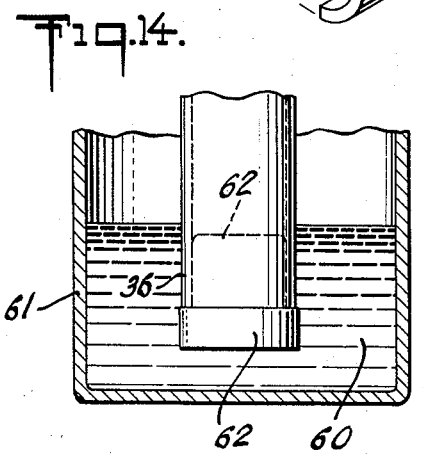
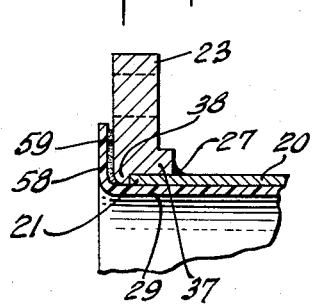
INVENTORS:
DOUGLAS R. LEWIS
JOSEPH A. JAFFE
BY
ATTORNEY

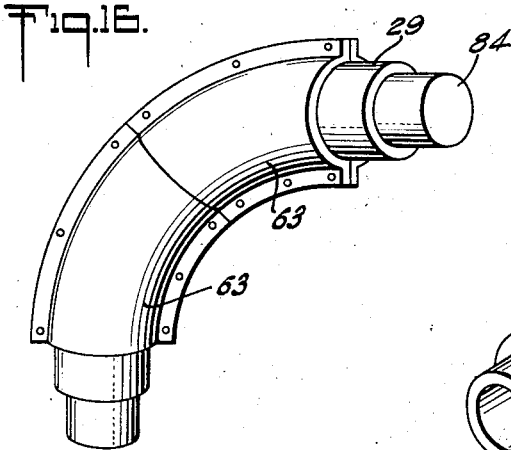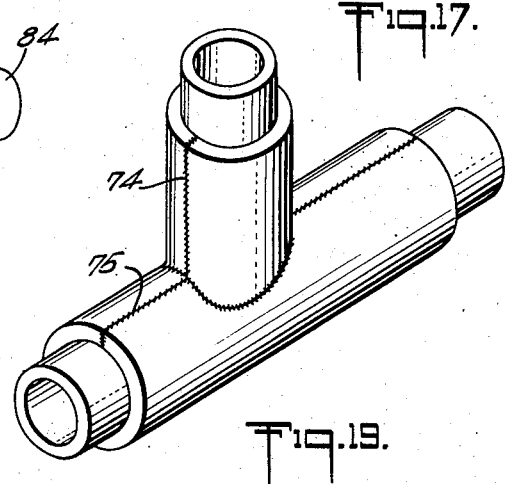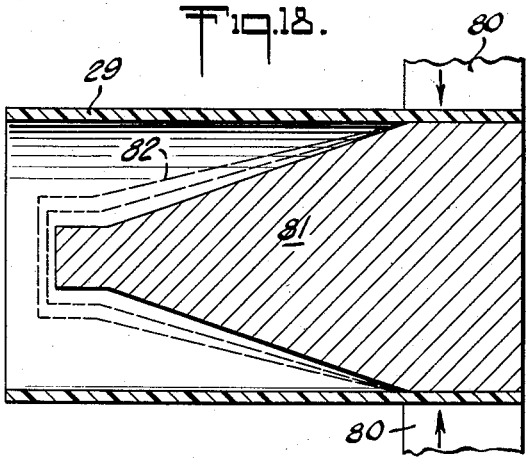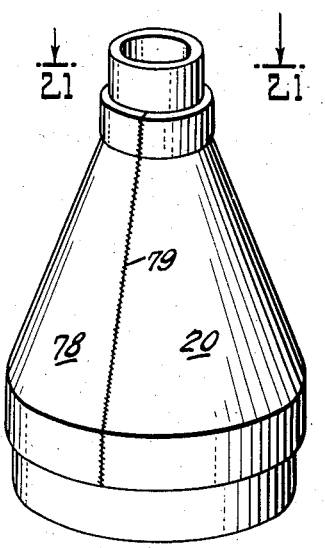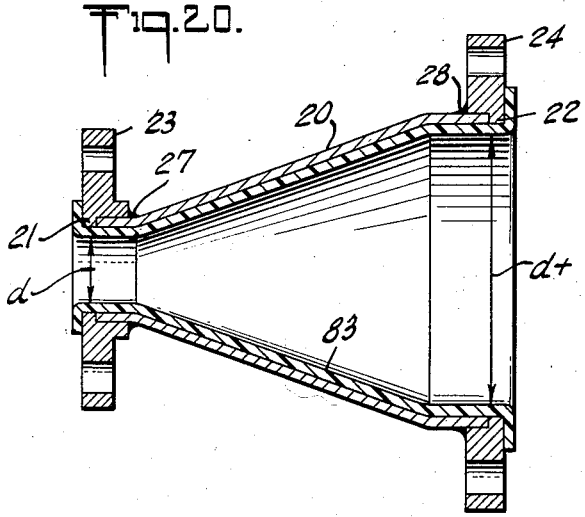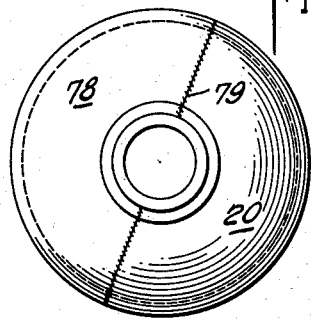

2,907,103
Patented Oct. 6, 1959

United States Patent Office

2,907,103

METHOD OF MAKING AN INTERNALLY LINED PIPE

Douglas R. Lewis, Summit, and Joseph A. Jaffe, West Orange, N.J.

Application January 7, 1957, Serial No. 632,713

6 Claims. (Cl. 29—421)

This invention relates to lined pipes and the method of making them for use in conveyor circuits for transporting chemicals and other materials, said pipes having rigid outer metal pipe sections lined, pursuant to the invention continuously internally and at both ends. A further feature of the invention consists in forming the rigid outer metal pipe section with flange rings to facilitate bolting the section to other parts of the circuit while assuring continuous contact of the material conveyed with the liner only. A further feature of the invention consists in forming the outer pipe section of novel structure features to facilitate assembly of the end flange rings thereon and in externally welding the assembled parts.

Figure 6:
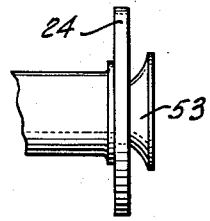
Figure 7:
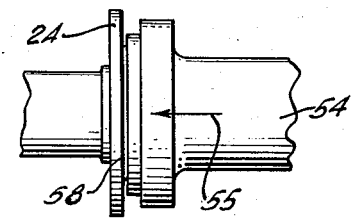
Figure 8:
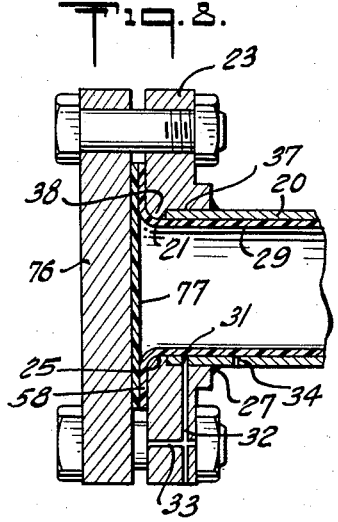
Figure 9:
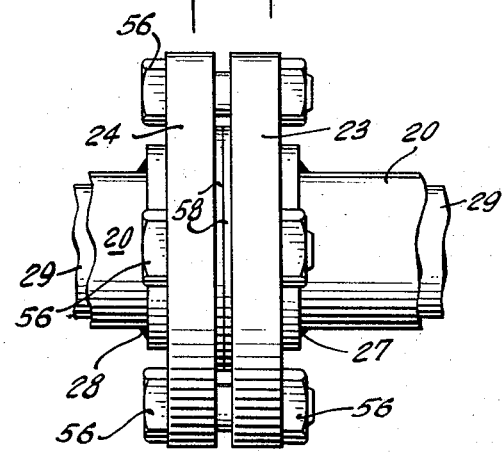
Figure 10:
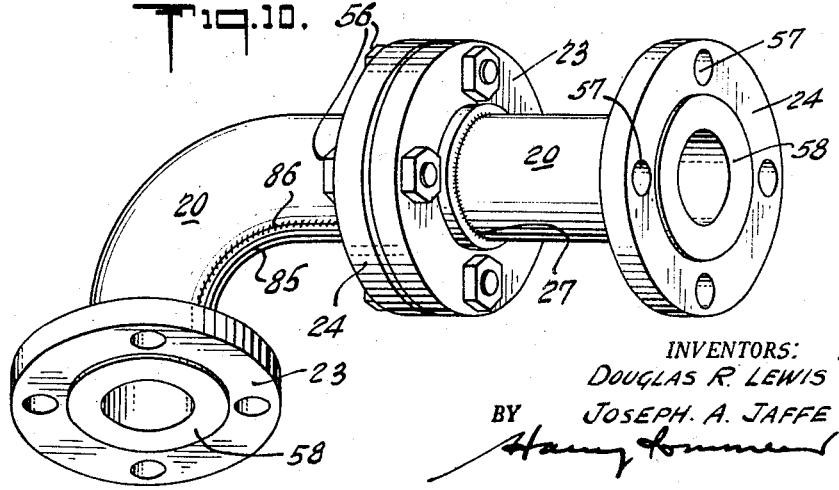

The internally lined pipe, pursuant to the invention, may be of any desired or convenient outline such as straight sections, elbows, T's, reducers, "blind flanges" and other forms of conveyor structures. Further objects and features of the invention are described below, set forth in claims and illustrated in the accompanying drawings, wherein:

Fig. 1 is a schematic, vertical sectional view of a method of making a liner pipe for use in carrying out the invention, Fig. 2 is a perspective view of a section of pipe cut to desired length, Fig. 3 is an elevational view thereof, showing in dotted lines, the original length of said section, and in full lines, the length to which the same has been stretched longitudinally in one method of facilitating insertion thereof into the rigid outer metal pipe section, Fig. 4 is an elevational view of a straight outer pipe section having flange rings secured thereto, the inserted liner pipe being shown projecting therefrom at that stage of fabrication, Fig. 5 is a fragmentary, perspective view of one end of the outer pipe and attached flange ring, the end of the projecting liner pipe being shown partly flared, Fig. 6 is a similar view, showing the so partially flared end of the liner pipe, Fig. 7 is a similar view, showing the step of flattening the partly flared liner pipe end against the flange ring, Fig. 8 is a fragmentary, sectional view of one end of an internally lined pipe embodying the invention having secured thereto and being closed by a "blind" end plate, Fig. 9 is a similar view of ends of internally lined pipes embodying the invention secured together, Fig. 10 is a perspective view showing an elbow and straight section embodying the invention secured together, Fig. 11 is a perspective view of a partially formed, liner T embodying the invention, with outer pipe sections 20, 65 mounted thereon, Fig. 12 is a similar view showing the further section 69 completing the outer pipe T mounted on liner T 29′, Fig. 13 is an exploded, perspective view of another form of outer pipe section T formed of two parts to be secured together over a liner T, Fig. 14 is a schematic view showing one end of a liner pipe immersed in a liquid to render the same compatible to adhesives, Fig. 15 is a fragmentary, sectional view of a lined pipe section end embodying the invention, the liner end being shown flared over the flange ring with an adhesive interposed therebetween, Fig. 16 is a perspective view showing a liner pipe section initially of straight form, being bent under pressure to conform the same to an outer section such as the elbow shown in Fig. 10, Fig. 17 is a perspective view of a partially formed internally lined T embodying the invention, Fig. 18 is a sectional view of another form of liner pipe embodying the invention, Fig. 19 is a perspective view of the so-formed liner inserted into an outer section, Fig. 20 is a sectional view of the completed lined pipe of that form, and Fig. 21 is a top plan view on line 21—21 of Fig. 19.

As shown in the drawings illustrating some practical applications of the invention (and wherein the same reference characters represent corresponding parts throughout the several views), the internally lined pipe comprises a rigid outer metal pipe section 20 open at both ends 21 and 22 and flange rings 23, 24 having openings 25 (Fig. 8) 26 for registry with the ends of the outer pipe section, (said openings being defined by portions for registration with the ends of the pipe section) disposed on said pipe section and externally welded thereon (as at 27, 28, Fig. 4). The liner pipe 29 to be inserted in the outer pipe section 20, is preferably formed of greater length than the outer pipe section and of approximately equal outer diameter to the internal diameter of the outer section so as to form a tight fit therein. While the invention is not limited thereto, the difference between the outer diameter of the liner 29 and the inner diameter of the outer metal pipe section 20 may be very slight (a difference of the order of .0001 inch for example, has been found practical) and the liner may be made very thin walled (for example, less than .075 inch thick) while the outer metal pipe section 20 may be formed of substantially heavy metal, such as steel, having substantial rigidity and which may be painted if desired for added protection.

To facilitate inserting the liner 29 in the rigid outer section 20, the former may be elongated to reduce the diameter thereof (as by stretching the same longitudinally by grasping the ends thereof and moving them apart) from the normal form shown at 29 in Fig. 3 in dotted lines, to the form shown in full lines 30 in Fig. 3. After the so elongated liner has been inserted into the outer section 20 it is then permitted to contract longitudinally (and expand diametrically) within the outer section, 20, into tight engagement therewith.

Outer section 20 may have a bleeder hole 34 formed therein for escape of entrapped air. The same hole may be used to pump a gas under pressure such as compressed air intermediate the liner and outer pipe section, in another form of facilitating insertion of the liner in the outer pipe section. Outer section 20 (Fig. 8) may be provided with a bleeder hole 31 at the end thereof and the flange ring 23 may be provided with openings therethrough 32, 33 disposed in crossing relation and leading to opposite free edges of the flange ring so that the flange ring may be positioned (in initial assembly) on the outer section 20 and rotated to register the openings 32, 33, with the opening 31 in the outer section 20, permitting the escape of any entrapped air through either the hole 32 or 33 whether the lined pipe be disposed vertically or horizontally and assuring a constant avenue of escape of such entrapped air in a downward direction with the pipe in either position; the likelihood of the end of the escape aperture becoming contaminated is thus obviated as one aperture (32 or 33) will always open downwardly.

The portions 35, 36 of the liner 29 projecting through the flange ring openings 25, 26 (Fig. 4) are flared against the flange rings, pursuant to the invention, so that the pipe section will be lined pursuant to the invention continuously internally and at both ends (Figs. 9 and 10).

The openings 25, 26 (Figs. 4, 8, 15) of flange rings 23, 24 have a portion 37 of substantially equal diameter to the outer diameter of the outer pipe sections 20, and have adjacent portions 38 of less diameter than the outer diameter of the outer section 20, forming a shoulder with which the end 21 of the outer pipe section 20 abuts on assembly of the flange ring on the outer section. Portions 38 are preferably arced outwardly so that the ends 35, 36 of the liner may be smoothly flared thereover as above described and shown in the drawings. In practice, the flange rings 23, 24, may be welded as at 27, 28 externally to the outer pipe section 20, either prior to or after insertion of the liner 29 therein. In some cases, such as in the formation of lined T's or lined elbows (Figs. 11, 12, 13, 17, 16, 10) pursuant to the invention, the liner pipe may be first inserted into the outer section and then the flange rings positioned against the outer section and then externally welded thereto. The liner may be water-cooled during the external welding operation, if desired. Straight lined sections embodying the invention may have the flange rings welded to the outer section prior to insertion of the liner pipe therein or thereafter, as desired. The flange rings 23, 24 are secured to the outer pipe sections non-rotatably by welding the same thereto, as above noted, rigidly securing said parts together in assembled relation and holding them against any relative movement in any direction (a serious defect of other forms of lined pipe proposed heretofore is that there may be relative movement in at least one direction after completion).

Fabrication of the lined pipe as above described and shown in the drawings with the welds 27, 28 externally, eliminate the "whiskers" and rough edges which would injure the parts and spoil their fit if such welding were performed internally, and eliminates contamination which would result from internal welding.

The liner pipe 29 is made of a plastic material which may be formed into thin walled tubes of constant density and high dielectric value, having good resistance to erosion and contamination, is inert to chemicals, has good heat resistance and is serviceable over a wide range of temperatures. A plastic material well fitting this definition is tetrafluoroethylene resin which (Fig. 1) may be extruded from powder granules 39 urged by the pressure ram 40 through the ring-like orifice defined by the forming tube 41 and the extrusion die 42 therein. Tube 41 may have heat bands 43 or the like and temperature controls such as thermocouples or the like. Thus, the granules are converted into an endless length 44 of liner tube of precisely the desired wall thickness and diameter which may be supported at the discharge end 45 of the tube 41 on a suitable support 46. The endless length of liner tube 44 may periodically either be cut from or removed from the support 46 and cut into suitable lengths of liner pipe 29 whose outer diameter would be substantially equal to the inner diameter of the outer pipe section 20 for which it is to be the liner. Other plastic materials 29 presently available or hereafter available, fitting the definition above mentioned, may be used to form the endless tube 44, such as polyethylene, vinyl and butyral plastics. In practice, liners formed of tetrafluoroethylene, as above noted, have been found by us to be well adapted to carrying out the invention, but other materials as above stated having the required properties may be used in carrying out the invention. The liner 29 and the internally lined pipe made pursuant to the invention may be tested in practice, at every step of the process for dielectric and other characteristics.

Pursuant to the invention, soft gaskets are not used when the parts are assembled so that the periodic further tightening required in systems using soft gaskets is eliminated. Special adapters are not needed to connect lined sections embodying the invention as the flared ends of the lined sections, presently more fully described, form a perfect seal on bolting sections of lined pipe embodying the invention together (Figs. 8, 9 and 10).

Each of the projecting portions 35, 36 of the liner 29 (Fig. 4) is flared against the flange ring 23, 24 (Fig. 9) thereby providing a pipe section lined continuously internally and at the open ends thereof. The flaring operation may (Figs. 5 and 7) be performed in two stages, under heat and pressure. As shown in Fig. 5, a heated flaring tool 47 may be first inserted in the projecting portion 36 of the liner and rotated under pressure to form the partially flared end 53 (Fig. 6). Convenient means for so applying the tool 47, shown in Fig. 5, consist of rods 48, 49 secured to the flange ring 24, to which bearing member 50 is secured. Threaded stem 51 meshes with a threaded aperture in bearing member 50 and may be turned by hand wheel 52, thereby moving the heated flaring tool 47 into the projecting portion 36 of the liner and partially forming same as above noted to the form indicated at 53, Fig. 6. Then the flaring tool 47 is removed and a heated flat tool 54 (Fig. 7) is applied against the projecting portion of the liner under pressure (arrow 55) to flatten the liner end as noted at 58 against the flange ring 24. The thus formed completed lined pipe sections, pursuant to the invention, may then be joined (Figs. 9 and 10) with similarly formed lined pipe sections. Upon tightening the clamping means 56 passing through the holes 57 of the flange rings 23, 24, the flattened ends 58 of the lined sections are clamped in abutment, forming, in practice, lined sections with liquid and air tight seals admirably adapted to form lined conveyor systems, for conveying materials such as chemicals, and other fluids and materials other than liquids, to be conveyed.

After the final step of so forming the flattened end 58 on the liner (Fig. 7) the end may be quenched or permitted to cool at room temperature.

If the liner 25 is made of tetrafluoroethylene or other plastic material to which adhesives normally are non-adherent, and it is desired to provide an adhesive 59 (Fig. 15) intermediate the flange rings and flared ends of the liner, the projecting portions of the liner may be treated to render adhesives adherent thereto. For example (Fig. 14) the liner end 36 may be immersed in a bath 60 in a tank 61 to make the external surface of the liner end 36 adherent to adhesives (the end 36 may be internally closed by plug 62 or the like while immersed in bath 60). Any material suitable to the end of rendering the plastic adherent to adhesive may be used for bath 60; anhydrous ammonia may be used in the case of liners of tetrafluoroethylene. The adhesive 59 may be an epoxy paste for that plastic (or such other adhesive as is found desirable for the plastic material of the liner).

As above mentioned, the lined pipe embodying the invention may be formed in straight sections (Figs. 4 and 10), elbows (Figs. 10 and 16), T's (Figs. 11, 12, 13 and 17), or any other desired form. For fabrication of lined elbows, the liner 29 is preferably heated under pressure, as, for example, by inserting the heated liner 29 in arcuate clamps 63 (Fig. 16) to bend the liner 29 into the desired arc to facilitate its insertion in the outer section 20 (Fig. 10) of that outline. Where the outer section 20 is to be a T, rigid outer metal pipe sections are welded to a T liner pipe. To that end (Fig. 11) liner 29 is first fabricated as a T by cutting an opening 64 in the liner 29 and joining a second liner section 29' thereto (under heat and pressure or other bonding agency) to close the opening 64. Then rigid outer metal pipe sections are welded to form a hollow T on the so formed liner T. In Fig. 11 this is shown attained by first positioning two rigid outer pipe sections 20 and 65, having mating openings 66, 67 to receive the second section 29' of the liner, onto the liner as at 68, and then an outer section 69 (Fig. 12) conformed at one end 70 to the openings 66 and 67 is welded thereto as at 71. In the form shown in Figs. 13 and 17, the outer pipe section T is formed in T halves 72, 73, positioned over the liner T and welded thereover shown at 74, 75, Fig. 17.

The lined pipe system embodying the invention may be closed by "blind" end plates when desired, as shown in Fig. 8 wherein the end plate 76 has a disc 77 to contact the flattened end 58 of the liner 29 of the lined pipe section to be thus closed.

To form the liner for the elbow lined pipe, the liner (Fig. 16) may be positioned on a core 84 which has greater stability than the liner and the assembled core and liner heated and bent to arcuate form and then inserted in clamps 63, if desired, to bend the liner to its final form. In such cases the outer section may be suitably formed as by making it of two longitudinal mirror image halves 20, 85 (Fig. 10) welded together as at 86.

The invention is not limited to the forms shown in the drawings and described above but includes all other forms which may be made pursuant to the disclosure herein. For example, it may be utilized for the connection of conveyor section unit openings of different diameters or of different dimensions. Thus (Fig. 20), it may be used to provide an opening $d$ at one end 21 of the unit and a larger opening ($d$ plus) at the other end 22, the ratio of diameter $d$ plus to diameter $d$ being greater than 1:1. In that form of the invention, the outer pipe section 20 may be cast or otherwise formed to the contour shown (Figs. 18–21) or may be formed of two half sections 20, 78 (Fig. 19) immovably secured together as by welding (79). The liner 29 may be formed of a contour to fit within the so-formed outer pipe section, or may be formed of an initially straight (Fig. 18) form and heated and held (at one end) by clamp or pressure members 80 onto a mandrel 81 conforming to the internal opening of the outer section, the liner 29 then being drawn, spun or otherwise deformed (dotted lines, Fig. 18) to define the final form thereof (83, Fig. 20) or to an intermediate form (82, Fig. 18) and may then be inserted into the outer section. In either case, the parts are so proportioned that the liner will extend from both ends of the outer section. The flange rings 23, 24 would be secured by welding the same to the outer section externally at 27, 28 (Fig. 20), the outer ends of the liner being finally flared over the flange rings, as above described. As in the other forms of the invention, the flange rings may be secured to the outer section either prior to or after insertion of the liner therein. If the welding operation is performed after the insertion of the liner in the outer section, the liner may be internally cooled by water or other cooling medium passed therethrough while the flange rings are being externally welded to the outer section.

Having thus described our invention, what we claim as new and desire to secure by Letters Patent is:

1. The method of forming an internally lined pipe having a rigid outer metal pipe section, comprising forming a liner pipe of plastic material of greater length than the outer pipe section and of an outer diameter substantially equal to the inner diameter of said outer metal pipe section, so as to make insertion therein difficult, stretching the liner so as to increase the length and reduce the diameter thereof and inserting said liner while in said reduced diameter state, into said outer pipe section, simultaneously contracting the liner longitudinally and expanding the liner diametrically into tight engagement with the interior of the outer pipe section, forming flat flange rings with openings to register with the open ends of the outer pipe section and with internal shoulders for registration of the ends of said rigid outer pipe section therewith, welding said flange rings externally to said rigid outer pipe sections with the liner projecting through said flange rings, and flaring the projecting portions of the liner on the flange rings to thereby provide a pipe lined continuously, internally and at both ends, with said liner.

2. In the method of forming an internally lined pipe as set forth in claim 1, the further step which consists of closing the liner ends internally and immersing said ends in a bath to render the outer faces thereof receptive to adhesives, forming an adhesive coating intermediate the said liner ends and flange rings and flaring said liner ends over said flange rings and squeezing said adhesive coating therebetween under pressure.

3. In the method of forming an internally lined pipe as set forth in claim 2, the further step which consists of so flaring the liner end against the flange rings by inserting a flaring tool in said liner and rotating said tool to partially flare said liner ends and then applying a flat heated tool to the partially flared ends to completely flatten them upon said flange rings.

4. In the method set forth in claim 2, the further step which consists of forming the internal liner of plastic sections which, when assembled, form a hollow T outline, and then assembling the outer metal pipe sections over the plastic unit, and rigidly securing the outer metal pipe sections together into said T form in such assembled relation by non-rotating means holding them against any relative movement.

5. In the method set forth in claim 2, the further step which consists of forming the rigid, outer pipe section with openings of different dimensions at its ends and forming the flange rings with corresponding openings.

6. The method of forming an internally lined pipe having a rigid outer metal pipe section, comprising forming a liner pipe of plastic material of greater length than the outer pipe section and of an outer diameter substantially equal to the inner diameter of said outer metal pipe section, so as to make insertion therein difficult, inserting a gaseous medium intermediate the liner and outer pipe section to relieve the tight fit of the inner liner in the outer pipe section and inserting the liner in said outer pipe section while the tight fit is thus relieved, forming flat flange rings with openings to register with the open ends of the outer pipe section and with internal shoulders for registration of the ends of said rigid outer pipe section therewith, welding said flange rings externally to said rigid outer pipe sections, with the liner projecting through said flange rings, and flaring the projecting portions of the liner on the flange rings to thereby provide a pipe lined continuously, internally and at both ends, with said liner.

References Cited in the file of this patent

UNITED STATES PATENTS

| | | |
|---|---|---|
| 714,903 | Hinds | Dec. 2, 1902 |
| 748,807 | Spratt | Jan. 5, 1904 |
| 942,184 | Persons | Dec. 7, 1909 |
| 1,303,102 | Monrath | May 6, 1919 |
| 1,481,255 | Cumfer | Jan. 22, 1924 |
| 2,027,961 | Currie | Jan. 14, 1936 |
| 2,290,333 | Johnson | July 21, 1942 |
| 2,491,467 | Allan | Dec. 20, 1949 |
| 2,607,078 | Grimes | Aug. 19, 1952 |
| 2,608,501 | Kimble | Aug. 26, 1952 |